Sept. 20, 1938.  G. DOBKE  2,130,879
METHOD OF MAKING A VACUUM TIGHT JOINT BETWEEN SOLID BODIES
Filed March 24, 1937
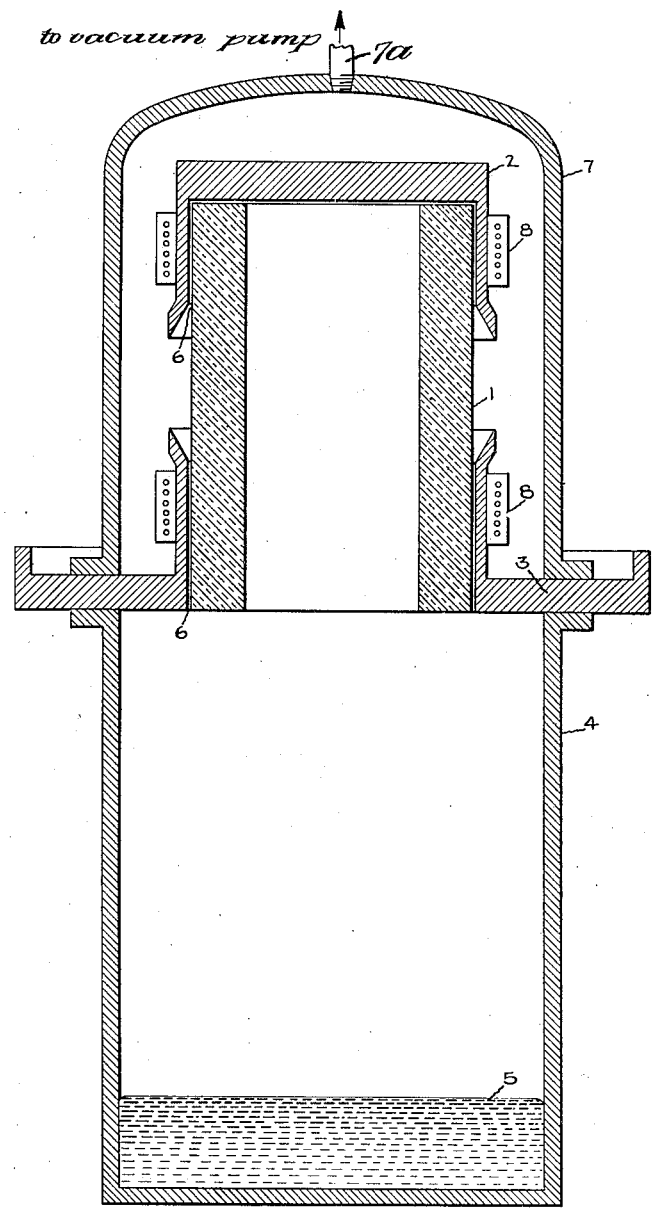
Inventor:
Gunther Dobke,
by Harry E. Dunham
His Attorney.

Patented Sept. 20, 1938

2,130,879

UNITED STATES PATENT OFFICE 2,130,879

METHOD OF MAKING A VACUUM-TIGHT JOINT BETWEEN SOLID BODIES

Günther Dobke, Berlin-Reinickendorf, Germany, assignor to General Electric Company, a corporation of New York Application March 24, 1937, Serial No. 132,878
In Germany April 8, 1936

3 Claims. (Cl. 49—81)

The present invention relates to a method of making a gas- or vacuum-tight joint or seal between solid bodies such as metallic and solid insulating bodies. More particularly it relates to the production of such a seal by a method wherein a gaseous composition of a metal, for example, iron carbonyl or iron nitrosyl, is decomposed by suitable means, for instance by the application of heat, within a gap between such bodies as assembled in position for ultimate rigid union thereby precipitating metal in the gap and forming a vacuum-tight metallic joint between the bodies.

The novel features which are characteristic of my invention are set forth in the appended claims. The invention itself, however, will best be understood from reference to the following more detailed description when considered in connection with the accompanying drawing in which the single figure is a vertical section of apparatus used in carrying this invention into effect and illustrative thereof.

Gas- or vacuum-tight connections of insulators to metal parts can be made in various ways. It is known to join an insulating member to a metal member by means of cement, lacquer, vitrified material or glass. For ordinary vacuum and high-vacuum service cemented packings, however, are unsuitable because the vessel is subjected to high temperatures during the manufacturing process or in operation. The production of gas-tight seals between metallic and insulating bodies by means of glass or vitrified material, on the other hand, demands a high degree of technical skill and care. Such joints, moreover, are very sensitive to mechanical stress.

The present invention provides a method by which the production of gas- or vacuum-tight joints between a metal and an insulator is very much simplified. In accordance with the invention a metal is deposited, from a gaseous composition, in the gap formed between metallic and insulating members of a composite body as assembled in the position in which they are to be rigidly united to each other. The deposited metal provides the packing of the gap. Suitable gaseous compositions, for example, are carbonyls and nitrosyls of metals such as iron, nickel and the like. Iron carbonyl with a composition of $Fe(CO)_5$ is decomposed at fairly high temperatures into iron and carbon monoxide.

With further reference to the drawing: I is an insulator, for example, for the current lead-in of an iron rectifier. This insulator may be composed, for instance, of a ceramic body such as porcelain. A cap 2, made for example of iron, closes off the insulator on top and serves as a carrier for the current lead-in. The mantle of the cap fits as snugly as possible on the insulator member. Flange 3 is to be welded into the vessel 5 and with its cylindrical part encompasses also the insulator, leaving only a confined gap. The whole is set on a vessel 4 containing a volatilizable metal composition 5 in liquid state such, for instance, as liquid iron carbonyl, which is evaporated by slight heating. The iron carbonyl vapor flows through the gaps 6 between the insulator and the metal cylinders encompassing it. The vaporization of the liquid metal composition and its flow through gaps 6 can be increased by covering the structure with a hood 7 which can be evacuated if desired through the conduit 7a. The cylindrical parts of the cap 2 and of the flange 3 bear electrical heating coils or windings 8, by means of which the gap compartment, through which the iron carbonyl vapor flows, is heated to about 500° C. At this temperature the iron carbonyl is decomposed, metallic iron being precipitated. The iron is deposited in the proximity of the electrical heating coils and closes up the gap between the insulator and the metal body. The tightness of the resultant metal seal is influenced by the intensity of the vacuum which may be provided within the hood.

To improve the adhesion of the sealing layer of iron to an insulating body such as porcelain, it may be expedient to metallize the porcelain surface beforehand.

What I claim as new and desire to secure by Letters Patent of the United States, is:

1. A method of forming a vacuum-tight joint between chosen solid bodies adapted to be bonded together by metal, which comprises passing a gaseous metallic compound through the gap between said bodies as assembled in position for ultimate rigid union, said compound having a vaporization point lower than the melting point of the bodies to be bonded together and further characterized in that when heated at a temperature above its vaporization point it is decomposed into gas and a metal capable of bonding the said chosen bodies together, and thermally decomposing said gaseous compound to deposit metal within and to fill said gap.

2. A method of producing a gas-tight seal between a metallic body and a ceramic body adapted to be sealed together by iron, which comprises passing a gaseous compound of iron having a vaporization point lower than the melting point of the said bodies to be sealed together through the gap between said bodies as assembled in position for ultimate rigid union and thermally decomposing said gaseous compound in the region of said gap thereby to fill the gap with iron.

3. A method of making a gas-tight seal between a metallic body and a metallized ceramic body adapted to be sealed together by iron, which comprises passing iron carbonyl in gaseous state through the gap between said bodies as assembled in position for ultimate rigid union and subjecting said iron carbonyl under vacuum to thermal decomposition in the region of said gap thereby to fill the gap with iron.

GÜNTHER DOBKE.